(12) United States Patent
Mate et al.

(10) Patent No.: US 7,869,699 B2
(45) Date of Patent: Jan. 11, 2011

(54) METHOD OF INTELLIGENTLY APPLYING REAL-TIME EFFECTS TO VIDEO CONTENT THAT IS BEING RECORDED

(75) Inventors: Elena Mate, Toronto (CA); Jitesh Arora, Thornhill (CA)

(73) Assignee: ATI Technologies ULC, Markham, Ontario (CA)

( * ) Notice: Subject to any disclaimer, the term of this patent is extended or adjusted under 35 U.S.C. 154(b) by 2254 days.

(21) Appl. No.: 10/657,453

(22) Filed: Sep. 8, 2003

(65) Prior Publication Data

US 2005/0053356 A1 Mar. 10, 2005

(51) Int. Cl.
*G11B 27/00* (2006.01)
*H04N 5/93* (2006.01)

(52) U.S. Cl. .................. 386/278; 386/280; 386/269

(58) Field of Classification Search .............. 386/64, 386/52, 76, 53, 4, 114
See application file for complete search history.

(56) References Cited

U.S. PATENT DOCUMENTS

| | | | | |
|---|---|---|---|---|
| 5,053,762 A | * | 10/1991 | Sarra | 345/641 |
| 5,923,869 A | * | 7/1999 | Kashiwagi et al. | 713/501 |
| 6,337,947 B1 | * | 1/2002 | Porter et al. | 386/55 |
| 7,336,712 B1 | * | 2/2008 | Linnartz et al. | 375/240.26 |
| 2001/0012436 A1 | * | 8/2001 | Nakaya | 386/52 |
| 2003/0086686 A1 | * | 5/2003 | Matsui et al. | 386/52 |
| 2003/0149980 A1 | * | 8/2003 | Hassell et al. | 725/39 |
| 2008/0184297 A1 | * | 7/2008 | Ellis et al. | 725/39 |

* cited by examiner

*Primary Examiner*—Thai Tran
*Assistant Examiner*—Girumsew Wendmagegn

(57) ABSTRACT

A mechanism is presented for editing a video stream as the stream is received, allowing real-time displaying and storing of the edited video stream without requiring the received video stream to first be recorded. The mechanism allows the selection of editing options prior to starting or during the record process. The mechanism can monitor the input video stream for specific characteristics and edit the video stream according to predefined editing options based on those characteristics and/or user inputs. Special effects can be intelligently selected based upon internal and external information about the video stream, for example, user actions, input source, and content information.

32 Claims, 6 Drawing Sheets

METHOD OF INTELLIGENTLY APPLYING REAL-TIME EFFECTS TO VIDEO CONTENT THAT IS BEING RECORDED

BACKGROUND

1. Field of the Invention

The present disclosure relates to video systems and, more particularly, to the recording and modifying of video content.

2. Description of the Related Art

Video recorders are commonplace in many households. Video editing tools are also becoming increasingly popular allowing users to customize and add special effects to recorded video.

To add special effects to live or broadcast video, a user must first record the video content. After the recording is finished, the user edits the recorded video using, for example, a video editing tool to apply the desired effects. The user observes the current properties of the recorded video stream and selects editing options and configures the editing tool to edit the recorded video. Because the user must first record the video content, useful information is unavailable to an editor. For example, the recorded video does not contain video source information, for example, whether the user changed channels, TV Guide information for a particular content, source information such as a particular channel or VCR tape, and the like.

A more convenient system is desired that eliminates the need for recording the video content prior to editing.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE EMBODIMENT(S)

The present disclosure presents a mechanism for editing a video stream as the stream is received, allowing real-time displaying and storing of the edited video stream without requiring the received video stream to first be recorded. The mechanism allows the selection of editing options prior to starting or during the record process. The mechanism can monitor the input video stream for specific characteristics and edit the video stream according to predefined editing options based on those characteristics and/or user inputs. Special effects can be intelligently selected based upon internal and external information about the video stream, for example, user actions, input source, and content information.

Figure 1:
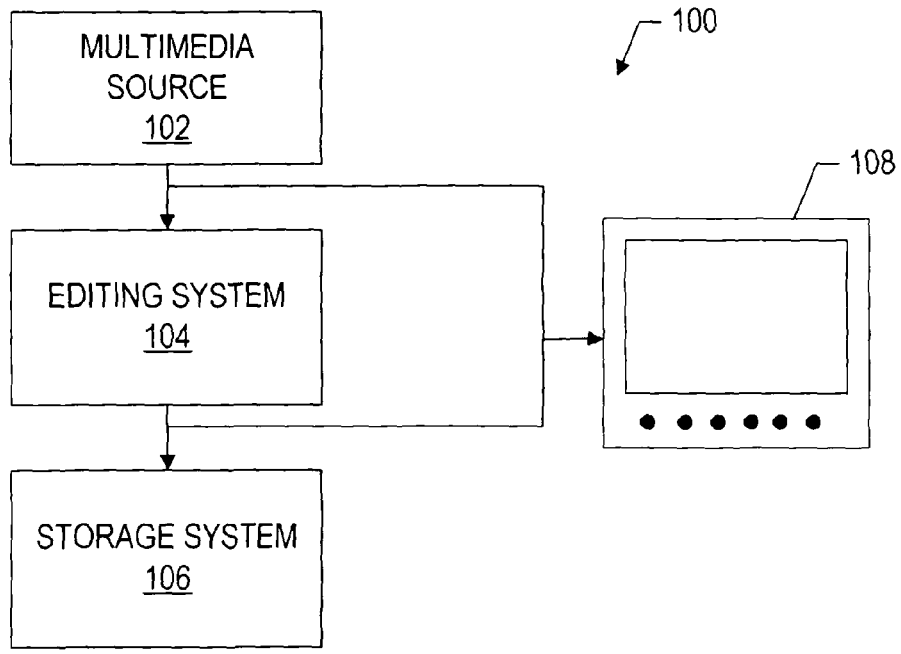
FIG. 1 illustrates an exemplary video system according to an embodiment of the present disclosure.

FIG. 1 illustrates an exemplary video system according to an embodiment of the present disclosure. Video system 100 includes a multimedia source 102, an editing system 104, a storage system 106, and a display device 108. Multimedia source 102 produces one or more video streams that are displayed on display device 108 and/or are sent to editing system 104. Editing system 104 produces one or more edited video streams that are displayed on display device 108 and/or are sent to storage system 106.

Editing system 104 edits the video stream as the stream is being received from multimedia source 102. Additionally, the edited stream is displayed and/or stored as the video stream is being received. Thus, the display and storage of the edited video stream is not significantly delayed compared to the direct display of the unedited video stream. Additionally, a full record of the video stream as received does not need to be stored prior to the editing of the video stream. Additionally, characteristics of the video stream that are not normally available from recorded video can be used to select editing options. For example, video from a particular source or channel can be edited differently than video from another source or channel.

Multimedia source 102 can be a live or broadcast signal from, for example, a cable television input, an antenna (terrestrial), or any other source of continuous, streaming video according to an embodiment of the present disclosure. In some embodiments of the present disclosure, multimedia source 102 can be a video cassette recorder (VCR) or a digital versatile disk (DVD, also referred to as digital video disk) such that editing system 104 is provided with a continuous stream of video.

Storage system 106 can be a video cassette recorder (VCR), writable digital versatile disk (DVD), storage memory on a computer system, or any other system for the recording/storing of a video stream according to an embodiment of the present disclosure.

Display device 108 can be an analog monitor such as a CRT monitor, a digital display device such as Plasma, flat panel monitors, and digital projectors, or any other device for the display of a video stream according to an embodiment of the present disclosure.

Figure 2:
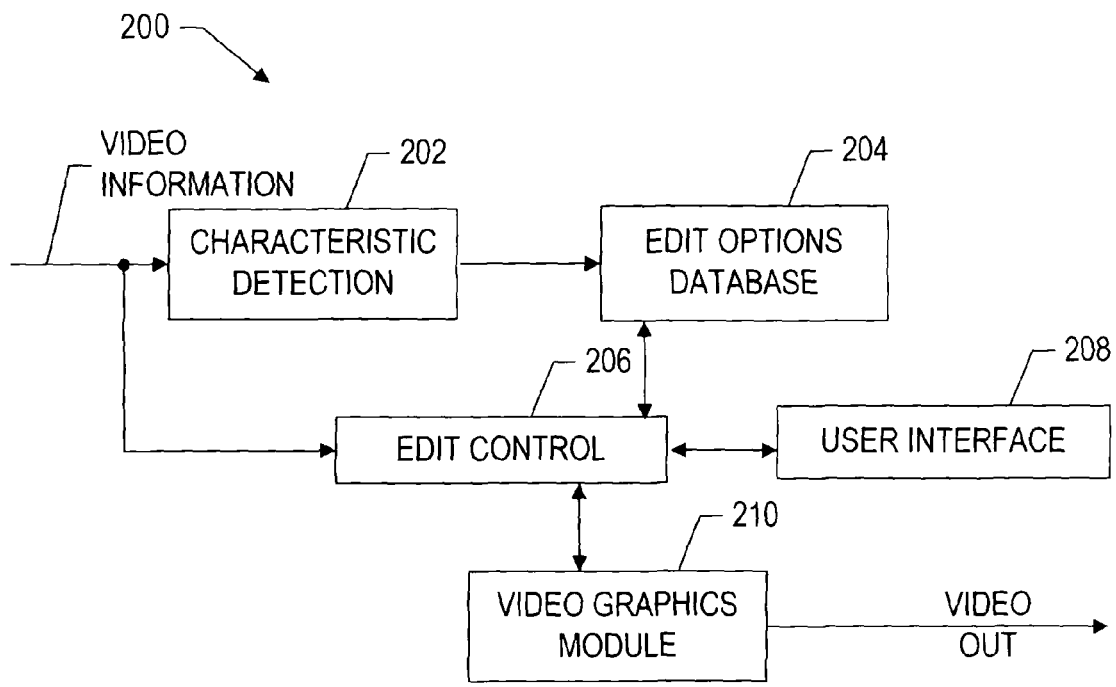
FIG. 2 illustrates an editing system according to an embodiment of the present disclosure.

FIG. 2 illustrates an editing system according to an embodiment of the present disclosure. Editing system 200 receives video information from, for example, multimedia source 102 and produces a video output (VIDEO OUT) sent to, for example, storage system 106 and/or display device 108. Video information can contain, for example, streaming video input, characteristics of the current stream, for example, channel change information, TV Guide database information, the particular program characteristics, and the like. Editing system 200 includes a characteristic detection module 202, an edit options database 204, an edit control module 206, a user interface 208, and a video graphics module 210.

Characteristic detection module 202 analyzes the video stream on the video input for different characteristics that are used to select editing options. For example, editing options can be selected based on a source of the video stream. One set of editing options can be used if the source of the video stream is a first source and another set of editing options can be used if the source of the video stream is a second source. One set of editing options can be used if the video stream is associated with a specific channel or a content type. Other selected editing options can be used if the video stream exhibits certain noise characteristics, for example, to remove noise from the video stream. Noise characteristics can include salt and pepper noise from for example, bad antenna reception, noise associated with poor quality VCR tape, motion artifacts from, for example, high motion sports programs, and the like.

Edit options database 204 receives the characteristic information and provides predetermined editing options, which can be, for example, user selected options, based on the characteristic information to edit control module 206. Edit control module 206 interfaces with video graphics module 210 to implement the selected editing options and to produce the edited video stream sent to a video out.

User interface 208 is used to configure edit options database 204. For example, a user can create, edit, and/or delete edit options. A user can define and configure options such as fade out, remove logo and the like and decide when these options are to be applied, for example, fade out when a changing channels. In one embodiment, once the process of editing has begun, a user is no longer able to configure the edit control. In another embodiment, a user can select one or more editing options from a plurality of predefined editing options in editing options database 204.

In one embodiment of the present disclosure, edit options include two features: an edit effect to be applied, and a condition upon which to apply the edit effect. Editing effects can include applying special effects such as removing a logo, implementing a page turning special effect, implementing a fading special effect, removing noise, selection of noise and/or quality filtering, and the like. Note that characteristics such as volume control and color/contrast changes are inherent display characteristics and not considered special effects.

Conditions upon which to apply the edit effect can include a channel change, type of input source such as a tuner, S-Video, composite, or component input, programming type. Different video sources can have different levels of noise. For example, digital video typically has lower noise levels that TV broadcasts. Type of source information can be used to intelligently select different noise reduction properties for each video source to be applied to the video stream. Effects applied based on programming type include, for example, different filtering that can be used for cartoons, news with talking heads, or high motion sports programs. The programming type can be derived from an electronic programming guide (EPG), user input, or based on the channel number or station name.

Additionally, filtering and other effects can be based on conditions such as frame rate, expected presentation size, or an expected viewing distance. Filtering and other effects can also be based on conditions such as a targeted encode bit rate or transmission bandwidth.

Additionally, fade-in and fade-out editing options can be applied to the beginning and end of the video stream.

Another editing option allows the removal of certain images, for example a station identification image from a corner of the picture.

Note that several modules of editing system 200 can be implemented as hardware or software modules. For example, edit control module 206 can be a video driver interfacing with video graphics module 210. Additionally, user interface 208 can be a graphical user interface (GUI) for presenting different options to a user and receiving user input to editing options.

Figure 3:
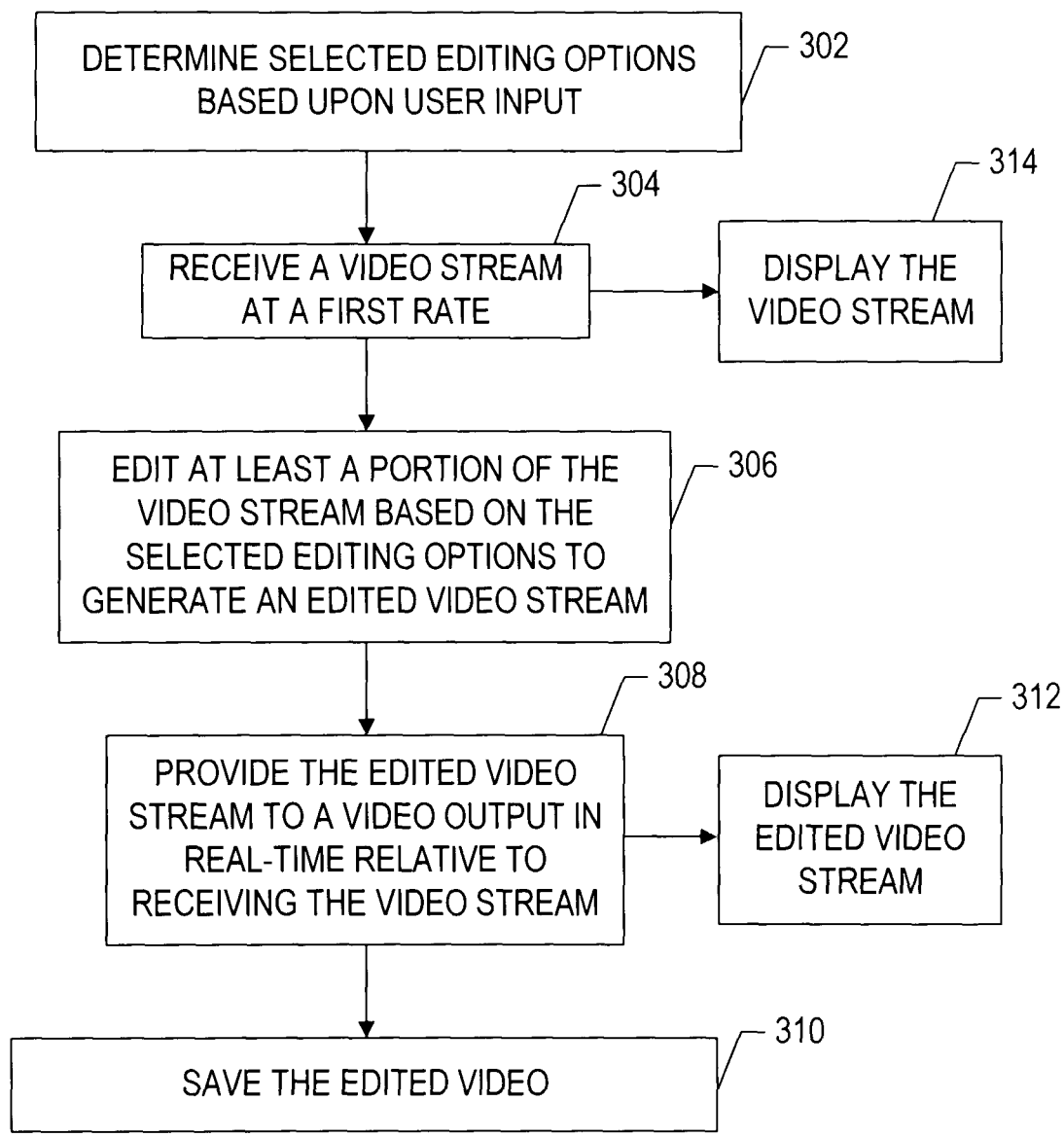
FIG. 3 illustrates an exemplary editing flow diagram according to an embodiment of the present disclosure.

FIG. 3 illustrates an exemplary editing flow diagram according to an embodiment of the present disclosure. Selected editing options are determined based on user input, step 302. For example, editing options can be based on characteristics of the stream, selected by the user, or both. A video stream is received at a first rate, step 304. The video steam can be displayed, step 314. At least a portion of the video stream is edited according to the selected editing options, generating an edited video stream, step 306. The edited video stream is provided to a video output in real-time relative to receiving the video stream, step 308. The edited video stream can be stored, step 310 and/or the edited video stream can be displayed, step 312.

Determining selected editing options based on user input can be performed prior to or during the receiving of the video stream. The editing, saving, and displaying occur in substantially overlapping time periods. That is, there is only a slight delay from the beginning of the receiving to the beginning of the editing, saving and displaying. As such, the video content is edited as received, and not first recorded prior to editing.

In one embodiment of the present disclosure, edit options can be based on historical data, that is, editing options selected by a user in the past, for example for a different video stream from the same source are used. For example, a user can apply specific editing options for a first channel and other editing options for a second channel. An options database can store such previous editing choices and allow the user to select such choices at a future date for the same channels.

Figure 4:
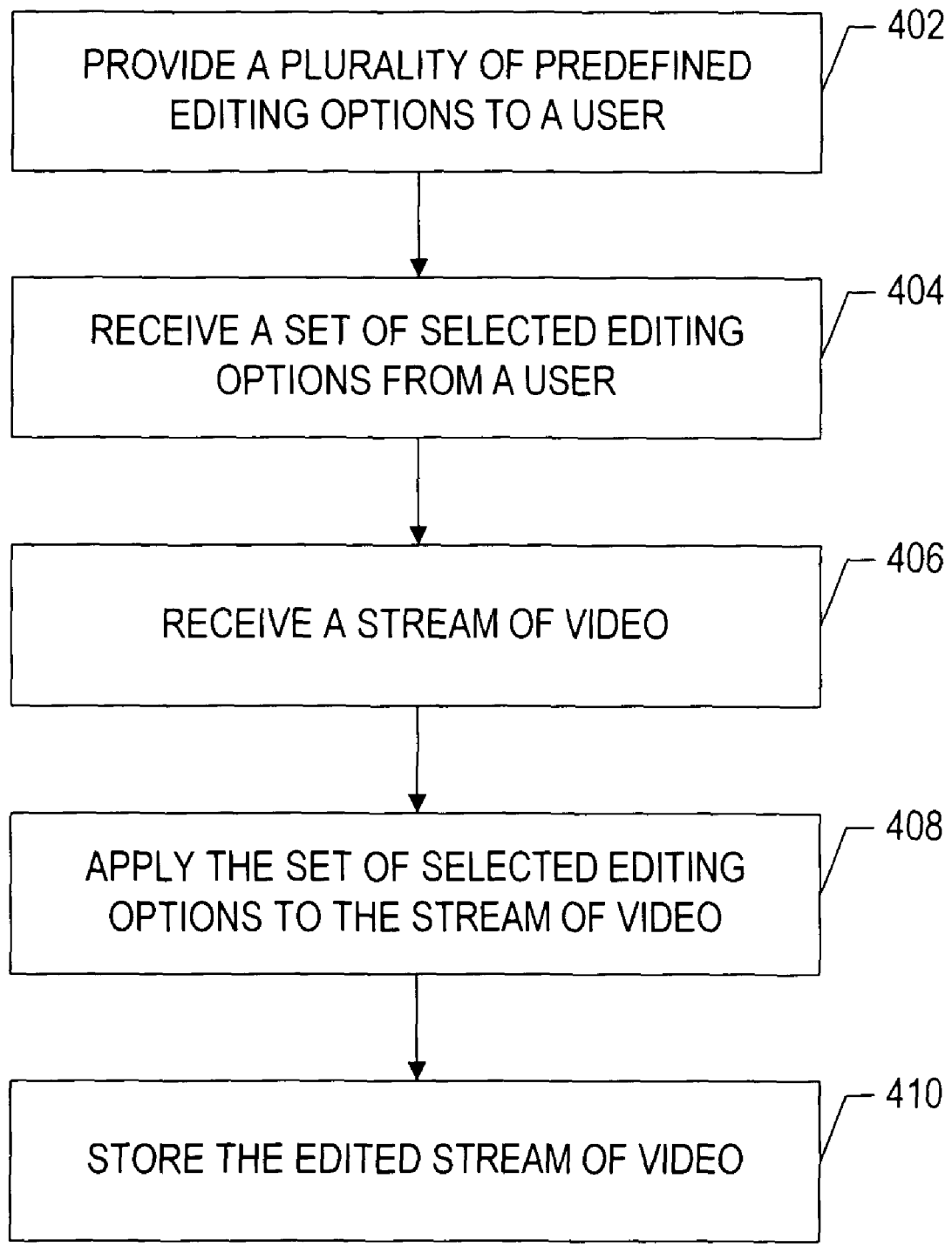
FIG. 4 illustrates an alternate editing flow diagram according to an embodiment of the present disclosure.

FIG. 4 illustrates an alternate editing flow diagram according to an embodiment of the present disclosure. A plurality of predefined editing options are provided to a user, step 402. Predefined editing options can be presented to a user, for example, through the use of a graphical user interface (GUI). A set of selected editing options are received from a user, step 404. A stream of video is received, step 406. The set of selected editing options are applied to the steam of video, step 408. The edited stream of video is stored, step 410.

Figure 5:
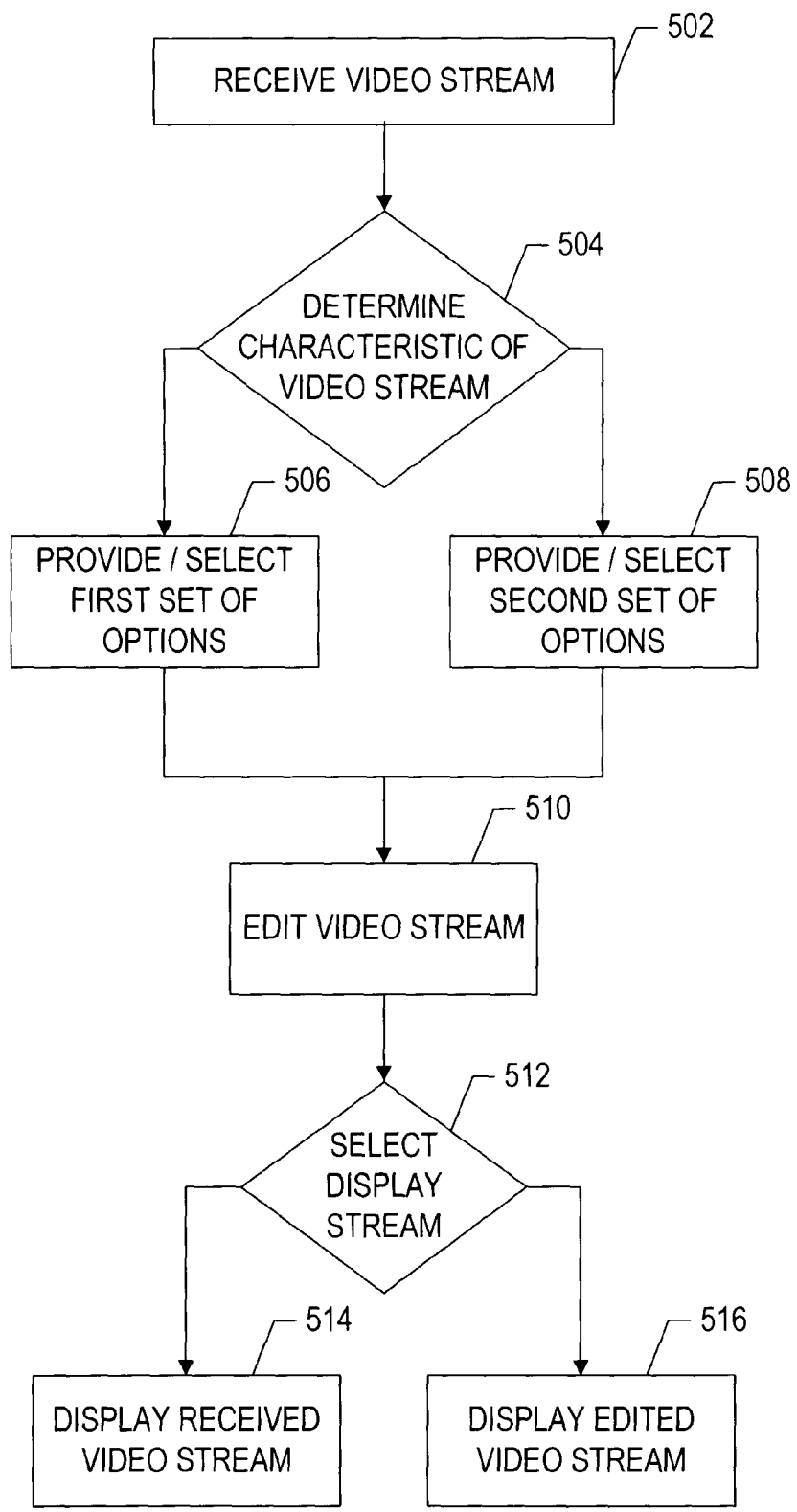
FIG. 5 illustrates another alternate editing flow diagram according to an embodiment of the present disclosure.

FIG. 5 illustrates another alternate editing flow diagram according to an embodiment of the present disclosure. A video stream is received, step 502. The characteristics of the video stream are determined, step 504. As indicated by the characteristics of the video stream, a first set of options is determined, step 506. Alternatively, as indicated by the characteristics of the video stream, a second set of options is determined, step 508. The video stream is edited according to the provided or selected set of options, step 510. A display stream is selected, step 512. If selected, the received video stream is displayed, step 514. If selected, the edited video stream is selected, step 516.

Figure 6:
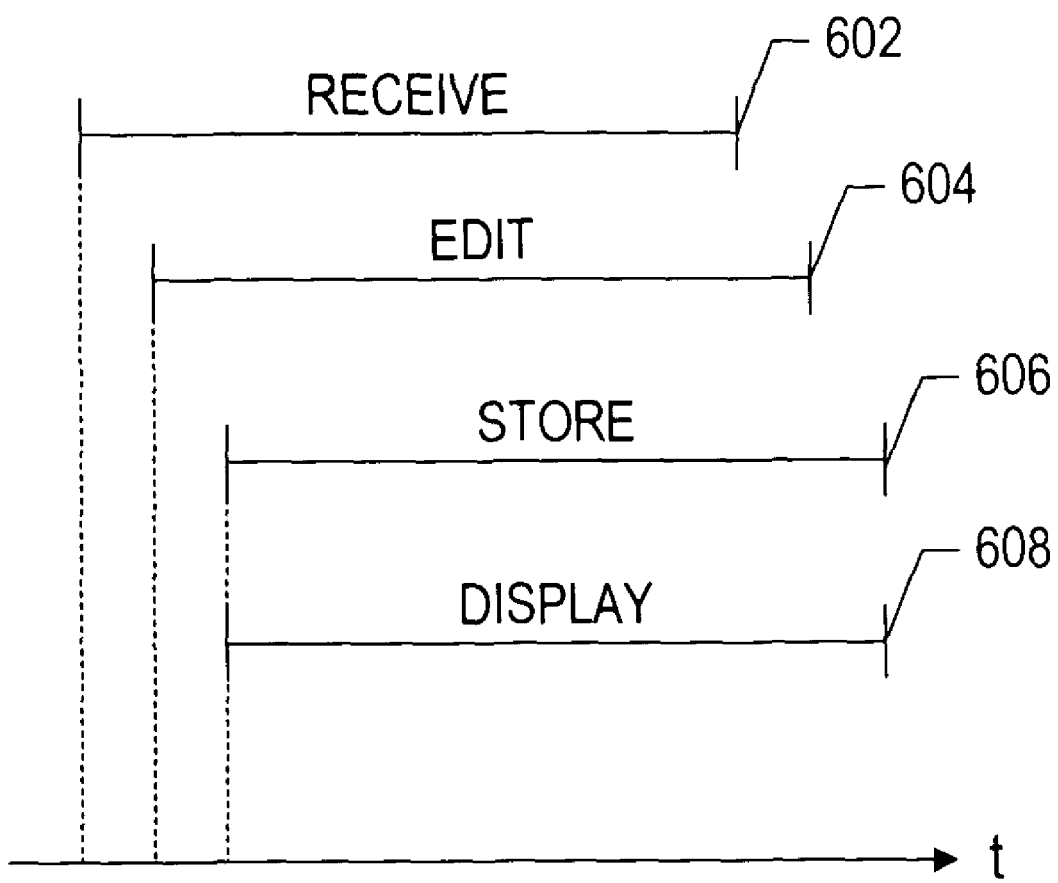
FIG. 6 illustrates an exemplary time line for a video system according to an embodiment of the present disclosure.

FIG. 6 illustrates an exemplary time line for a video system according to an embodiment of the present disclosure. A video stream having multiple video frames is received during time period 602. The video stream is edited during time period 604. The edited video stream is stored during time period 606 and displayed during time period 608. As illustrated, time period 604 substantially overlaps time period 602. For example, the video stream can begin to be edited as soon as within the time it takes to receive one frame of video. Additionally, the edited video frame can be displayed or stored as soon as the first frame of video is edited. Editing times can vary based on the selected options. In one embodiment, if the editing time exceeds a predefined maximum, video frames can be dropped and/or the user can be notified. Typical frame rates include 39.97 frames per second for analog video in NTSC format and 25 frames per second for PAL format. Typical edit time, that is, the time between the receiving of the video and the editing of the video is typically the time to receive one frame of video, that is $1/39.97$ of a second for analog video in NTSC format or $1/25$ of a second for video in PAL format.

According to an embodiment of the present disclosure, editing, storing and/or displaying occurs in real-time relative to a user's perspective of receiving the video stream. That is, a user is not able to discern a significant time delay between the receiving of the video stream and, for example, the displaying of the edited video stream. Thus, the editing, storing, and displaying are in real-time relative to a user's perspective.

Figure 7:
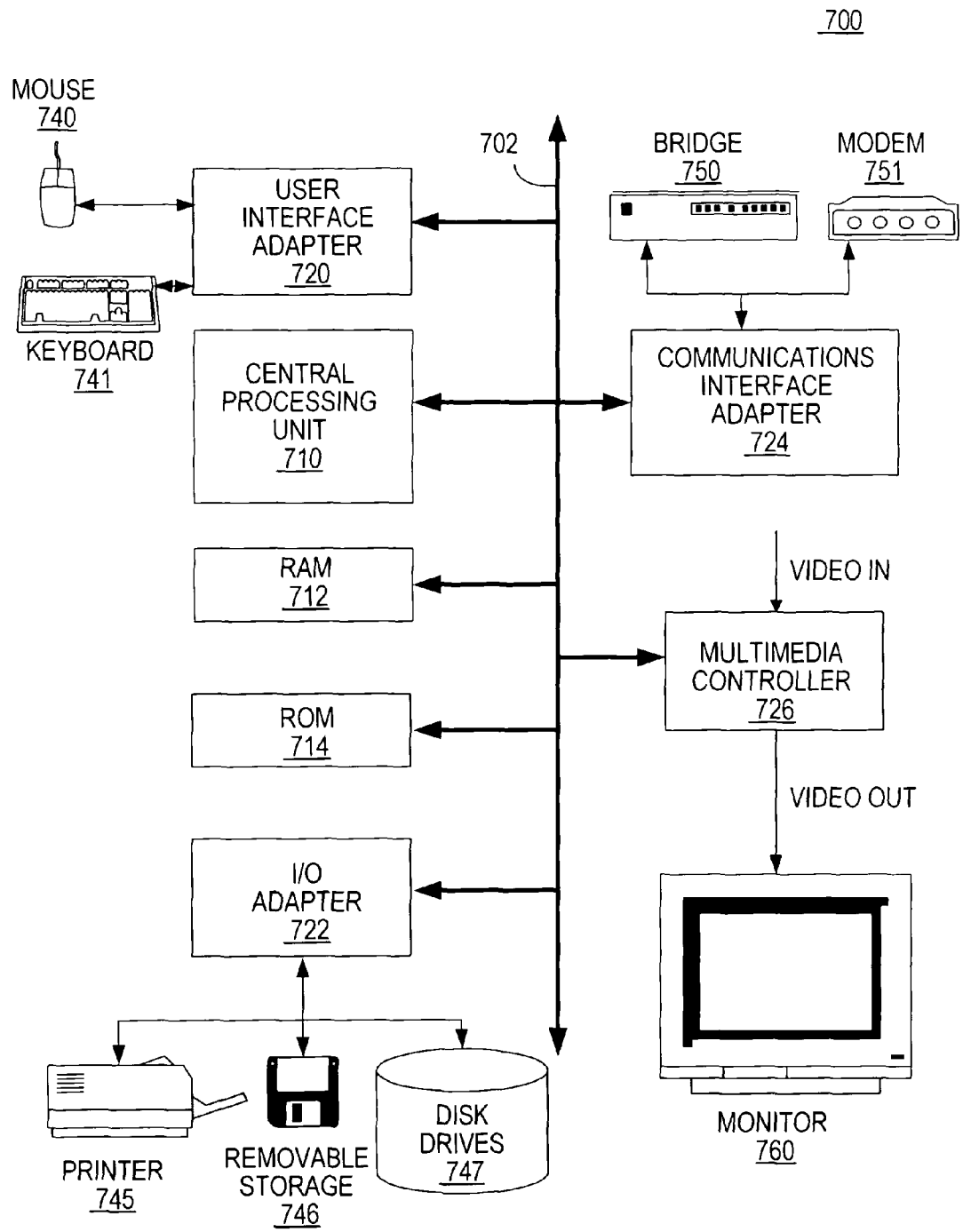
FIG. 7 illustrates an exemplary processing system according to an embodiment of the present disclosure.

FIG. 7 illustrates, in block diagram form, a processing device in the form of a personal computer system 700 according to an embodiment of the present disclosure. The computer system 700 is illustrated to include a central processing unit 710, which may be a conventional proprietary data processor, memory including random access memory (RAM) 712, read only memory 714, input output adapter 722, a user interface adapter 720, a communications interface adapter 724, and a multimedia controller 726. Note the central processing unit 710, the communications interface adapter 724, and video/graphics controller can individually be considered processing devices.

The input output (I/O) adapter 722 is further connected to, and controls, disk drives 747, printer 745, removable storage devices 746, as well as other standard and proprietary I/O devices.

The user interface adapter 720 can be considered to be a specialized I/O adapter. The adapter 720 is illustrated as connected to a mouse 740, and a keyboard 741. In addition, the user interface adapter 720 may be connected to other devices capable of providing various types of user control, such as touch screen devices.

The communications interface adapter 724 is connected to a bridge 750 such as is associated with a local or a wide area network, and a modem 751. By connecting the system bus 702 to various communication devices, external access to information can be obtained.

The multimedia controller 726 will generally include a video graphics controller capable of editing a video stream received on a video in input according to embodiments of the present disclosure. Multimedia controller 726 is also capable of displaying the video stream and/or the edited video stream upon the monitor 760, as well as storing the edited video stream, for example, in RAM 712 or any other storage medium available. Multimedia controller 726 can also be capable of providing audio to external components (not illustrated).

According to an embodiment of the present disclosure, editing system 200 can be within multimedia controller 726. Alternatively, portions of editing system 200 can be software drivers stored within, for example, RAM 712, ROM 714, or disk drives 747 and executed by central processing unit 710.

The above-disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving a video stream at an information handling system at a first rate, wherein the video stream is a broadcast video stream;
   editing at least a portion of the video stream at the information handling system to generate an edited video stream, wherein the editing is based on editing characteristics, the editing characteristics based on information selected from the group consisting of a source of the video stream, a station logo, television guide information, and a user action that modified the video stream;
   wherein editing occurs in real-time relative to a user's perspective of receiving the video stream; and
   recording the edited video stream for subsequent playback, the subsequent playback in response to a user request.

2. The method of claim 1, wherein the information is a source of the video stream.

3. The method of claim 2, wherein the information is a station logo.

4. The method of claim 1, wherein the information is received separately from the video stream.

5. The method of claim 4, wherein the information received separately from the video stream is television guide information.

6. The method of claim 1, wherein the information is based on a user action that modified the video stream.

7. The method of claim 6, wherein the user action is a channel change.

8. The method of claim 1, wherein the editing includes applying a special effect to the video stream.

9. The method of claim 8, wherein the special effect includes one or more of removing a logo, implementing a page turning special effect, implementing a fading effect, removing noise, selection of noise filtering, and selection of quality filtering.

10. The method of claim 1,
    wherein the recording occurs in real-time relative to the user's perspective of the receiving the video stream.

11. The method of claim 1, further comprising:
    displaying the video stream in real time relative to a users perspective of receiving the video stream.

12. The method of claim 1, further comprising:
    displaying the edited video stream in real time relative to a user's perspective of receiving the video stream.

13. The method of claim 1, wherein the editing characteristics are user programmable.

14. The method of claim 1, further comprising:
    wherein the editing characteristics are based on a source of the video stream.

15. The method of claim 14, wherein the editing characteristics comprise a first set of editing options when the source of the video stream is a first source, and comprise a second set of editing options when the source of the video stream is a second source.

16. The method of claim 14, wherein the editing characteristics comprise a first set of editing options when the characteristic indicates a specific noise characteristic.

17. The method of claim 14, wherein the editing characteristics are based on a channel associated with the video stream.

18. The method of claim 14, wherein the editing characteristics are based on a content type associated with the video stream.

19. The method of claim 1, wherein editing comprises modifying the video stream to remove noise from the video stream.

20. The method of claim 1, wherein editing comprises modifying the video stream to modify a predefined location of an image of the video stream.

21. The method of claim 1, wherein editing to modify the predefined location of an image comprises removing an overlay logo from an image of the video stream.

22. A method comprising:
    providing a plurality of predefined editing options to a user;
    receiving a set of selected editing options from a user, wherein the selected editing options is a subset of the predefined editing options;
    receiving a first stream of video;
    applying the set of selected editing options to the first stream of video to obtain an edited stream of video, wherein the applying is based on characteristics of the video stream, the characteristics selected from the group consisting of a source of the video stream, a station logo, television guide information; and a user action that modified the video stream; and storing the edited stream of video in real time relative to the user's perception of receiving the first stream of video.

23. The method of claim 22, wherein the plurality of predefined editing options comprises special effect options.

24. The method of claim 23, wherein the special effect options include one or more of removing a logo, implementing a page turning special effect, implementing a fading effect, removing noise, selection of noise filtering, and selection of quality filtering.

25. The method of claim 22, wherein the plurality of predefined editing options comprises implementing a page turning effect.

26. The method of claim 22, wherein the plurality of predefined editing options comprises implementing a fading effect.

27. The method of claim 22, wherein the plurality of predefined editing options comprises noise removal options.

28. The method of claim 22, wherein the plurality of predefined editing options comprises content specific options.

29. An editing system comprising:
a video in port configured to receive a video stream;
a characteristic detection module coupled to the video in port, the characteristic detection module configured to identify one or more characteristics of the video stream, the characteristics selected from the group consisting of: a source of the video stream; a station logo associated with the video stream; program guide information; and a user action that modifies the video stream;
an edit options database coupled to the characteristic detection module, the edit options database configured to select a set of predefined editing options based on at least one of the one or more characteristics;
a video graphics module configured to edit the video stream in real-time as the video stream is received based on the set of predefined editing options; and
a memory configured to record the edited video stream.

30. The editing system of claim 29, further comprising:
a user interface configured to receive user input; and
an edit control module coupled to the user interface, the edit options database, and the video graphics module, the edit control module configured to select another set of predefined editing options based on the user input.

31. The editing system of claim 29, wherein the video stream is a broad cast video stream.

32. An apparatus comprising:
means for receiving a video stream, the video stream comprising a plurality of video frames;
means for editing the video stream based on a characteristic of the video stream to produce an edited video stream, the characteristic selected from the group consisting of: a source of the video stream; a station logo associated with the video stream; program guide information; and a user action that modifies the video stream; and
means for recording the edited video stream;
wherein the means for editing is configured to perform editing substantially in the same time period as the means for receiving performs receiving, and wherein the means for utilizing is configured to perform utilizing substantially in the same time period as the means for editing performs editing.

\* \* \* \* \*